Figure 1:
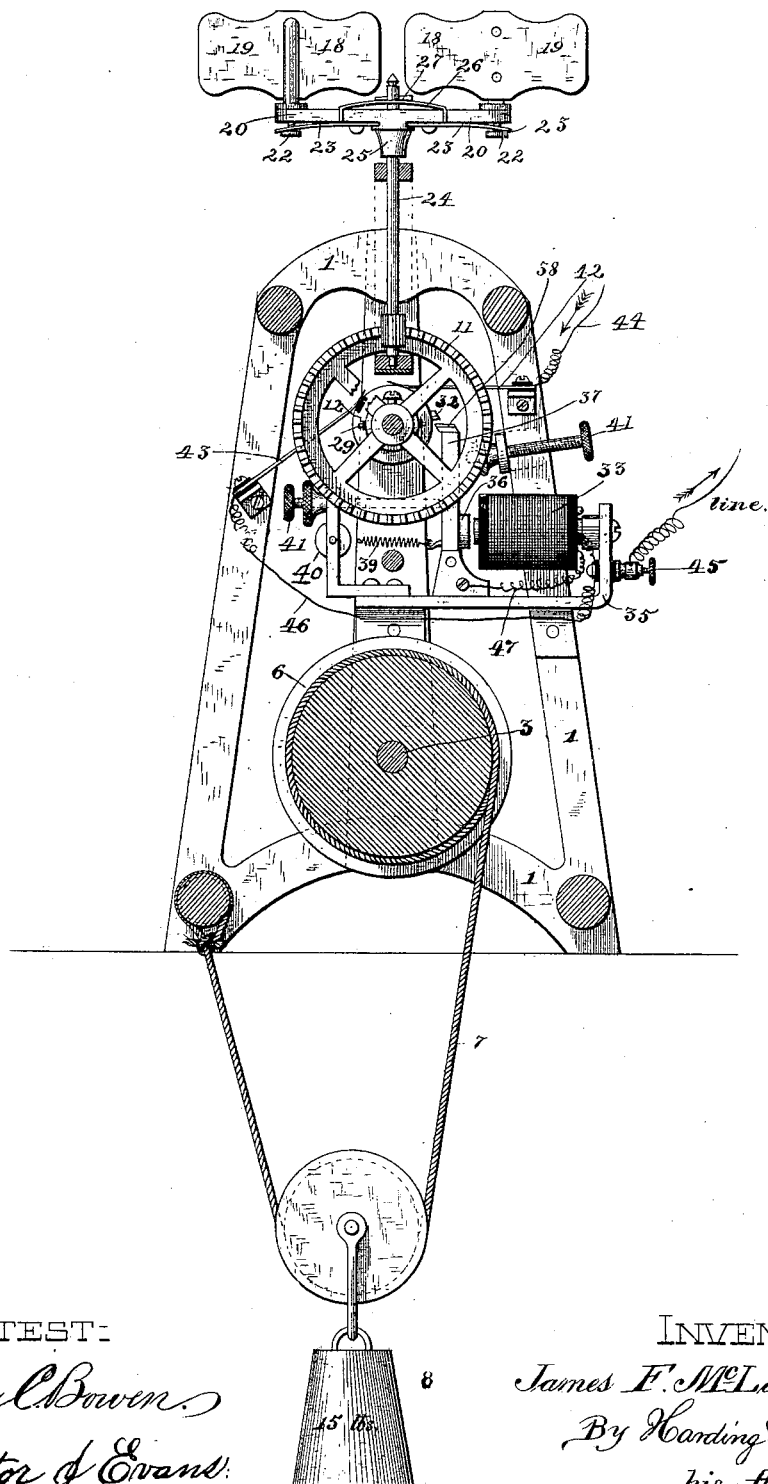

(No Model.) 4 Sheets—Sheet 1.

J. F. McLAUGHLIN.
SYNCHRONAL MOTOR FOR ELECTRICAL TYPE WRITERS.

No. 368,411. Patented Aug. 16, 1887.

ATTEST:
Percy C. Bowen
Victor J. Evans

INVENTOR:
James F. McLaughlin
By Harding & Tichenor,
his Attorneys.

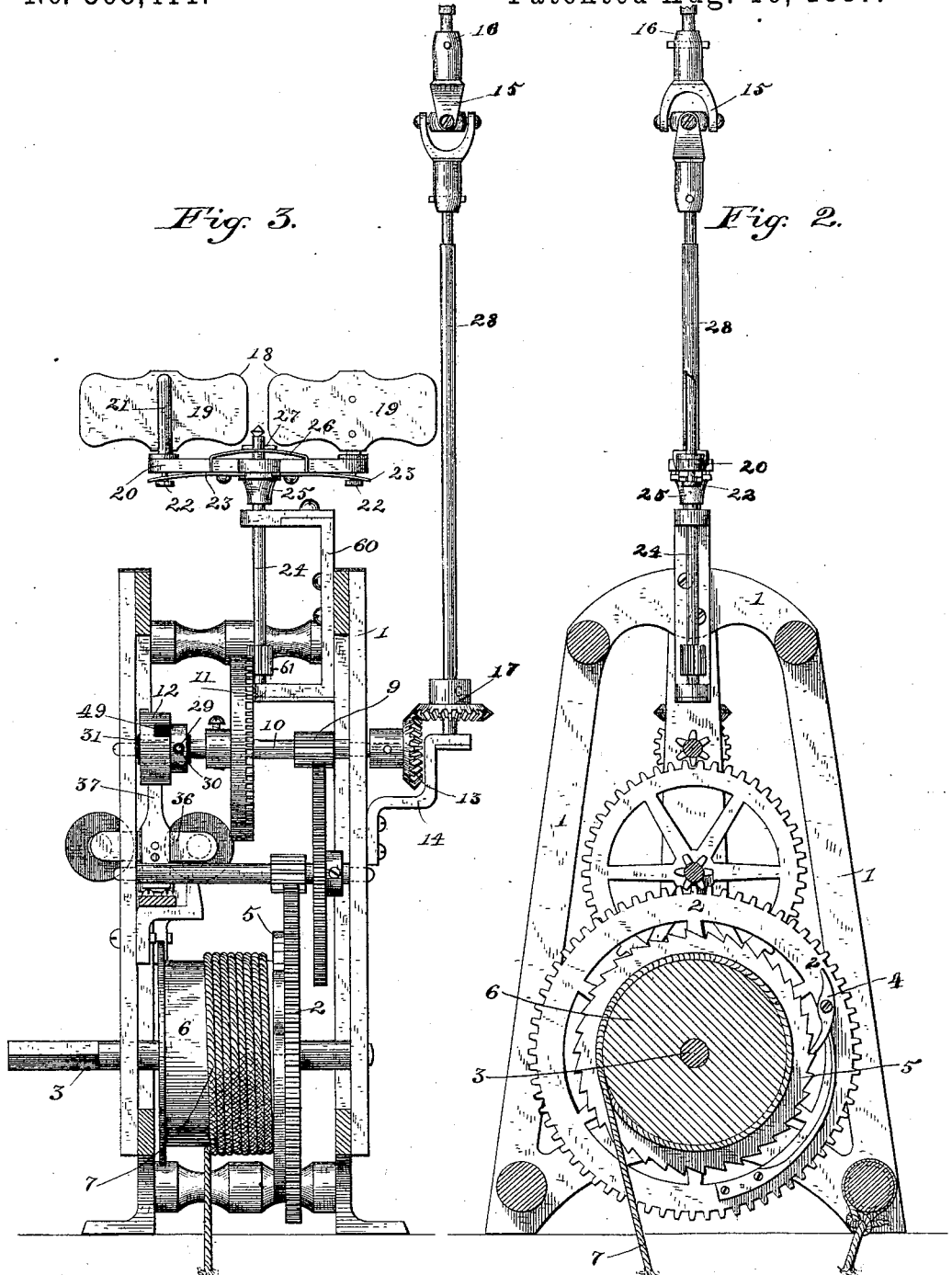

(No Model.) 4 Sheets—Sheet 3.
J. F. McLAUGHLIN.
SYNCHRONAL MOTOR FOR ELECTRICAL TYPE WRITERS.
No. 368,411. Patented Aug. 16, 1887.
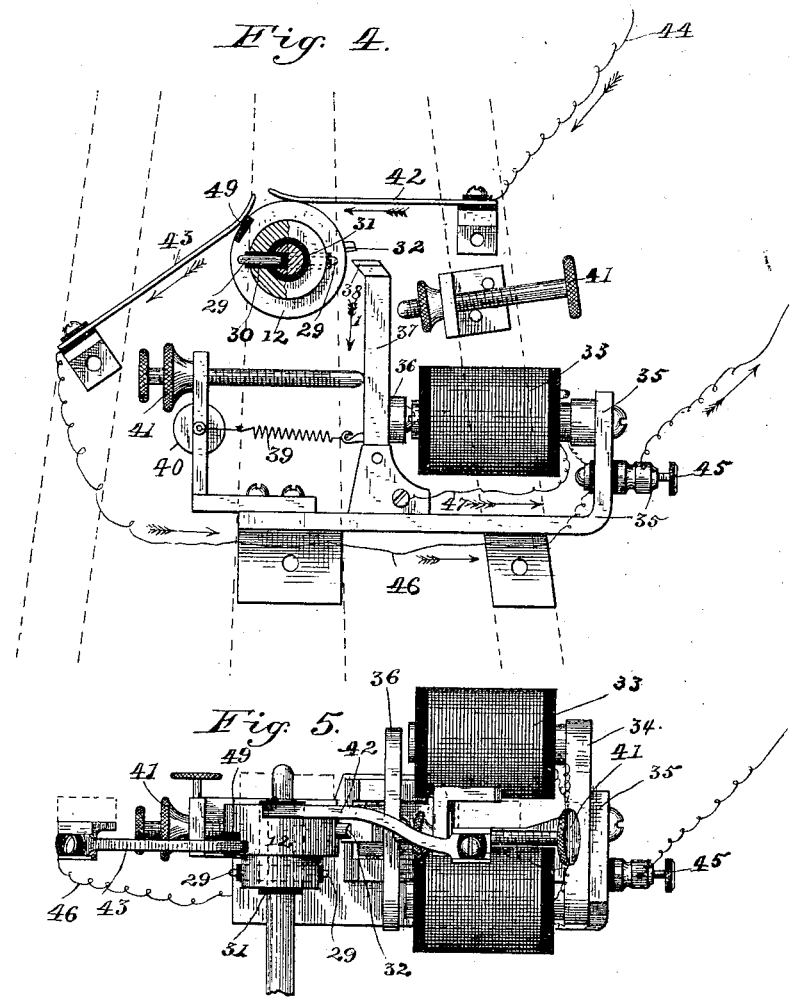
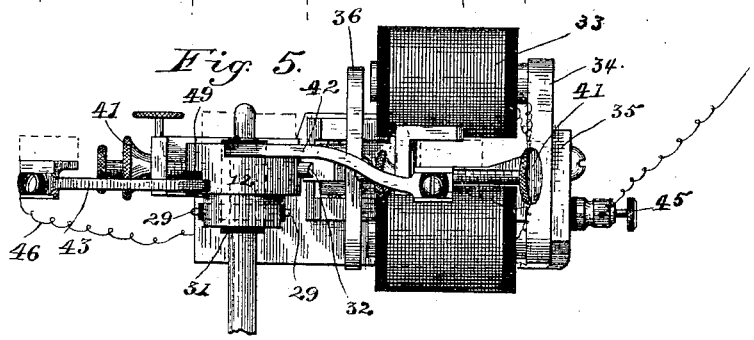
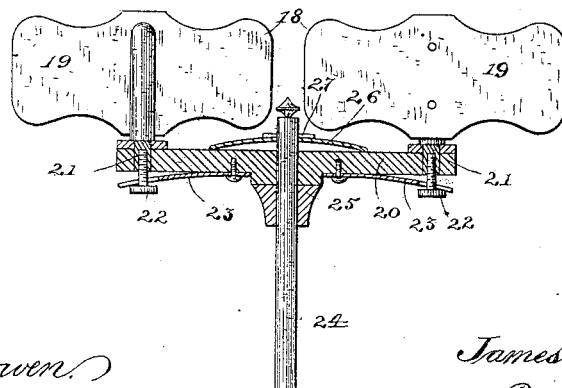
ATTEST:
Percy C. Bowen
Victor J. Evans
INVENTOR:
James F. McLaughlin
By Harding & Tichenor,
his Attorneys.

(No Model.)  4 Sheets—Sheet 4.

J. F. McLAUGHLIN.
SYNCHRONAL MOTOR FOR ELECTRICAL TYPE WRITERS.

No. 368,411.  Patented Aug. 16, 1887.

ATTEST:
Percy C. Bowen
Victor J. Evans

INVENTOR:
James F. McLaughlin
By Harding & Tichenor,
his Attorneys.

UNITED STATES PATENT OFFICE.

JAMES F. McLAUGHLIN, OF PHILADELPHIA, PENNSYLVANIA.

SYNCHRONAL MOTOR FOR ELECTRICAL TYPE-WRITERS.

SPECIFICATION forming part of Letters Patent No. 368,411, dated August 16, 1887.

Application filed April 1, 1887. Serial No. 233,292. (No model.)

*To all whom it may concern:*

Be it known that I, JAMES F. McLAUGHLIN, a citizen of the United States, residing at Philadelphia, in the county of Philadelphia and State of Pennsylvania, have invented certain new and useful Improvements in Electro-Automatic Synchronal Escapements; and I do hereby declare the following to be a full, clear, and exact description of the invention, such as will enable others skilled in the art to which it appertains to make and use the same.

My invention relates to an improved automatic electro-mechanical unison-motor. It will be obvious that such instrument can be adapted for various uses wherever a synchronous movement of electrally-connected apparatus is desired.

My invention is deemed to be particularly applicable for use in any instance wherein it is necessary to maintain synchronal action between two or more rotating shafts of any preferred form of motor (electrical or otherwise) which are placed, respectively, at two or more terminals of a line-circuit.

I am aware that numerous arrangements for obtaining synchronous movements have been heretofore used. My invention, however, differs radically from all such systems both in general principles of construction and operation as well as in its details of organization.

The particular object of this invention is to provide an efficient means for both imparting intermittent motion to the central shafts of my improved transmitter for electrical type-writers, which forms the subject-matter of a separate pending application, and to effect the maintenance of perfect synchronism between the said shafts when two or more of the instruments are located, respectively, at separate extremities of a line, so that by constantly correcting any inaccuracy in the relative speed of two widely-separated instruments at the termination of each complete revolution of their respective shafts even the smallest appreciable difference cannot exist for a greater period of time than that occupied during one full rotation of either of the shafts of said instruments, as will be better understood from the description hereinafter given.

With these ends in view, my invention consists in an improved organization of apparatus, details of construction, arrangements and combinations of parts, which will be more fully explained, and the specific points of novelty in which will be designated in the appended claims.

In the accompanying drawings, which form an essential part of this application, I have shown certain devices which are sufficient for carrying out my invention. However, I do not wish to be understood as limiting myself to special appliances.

Figure 7:
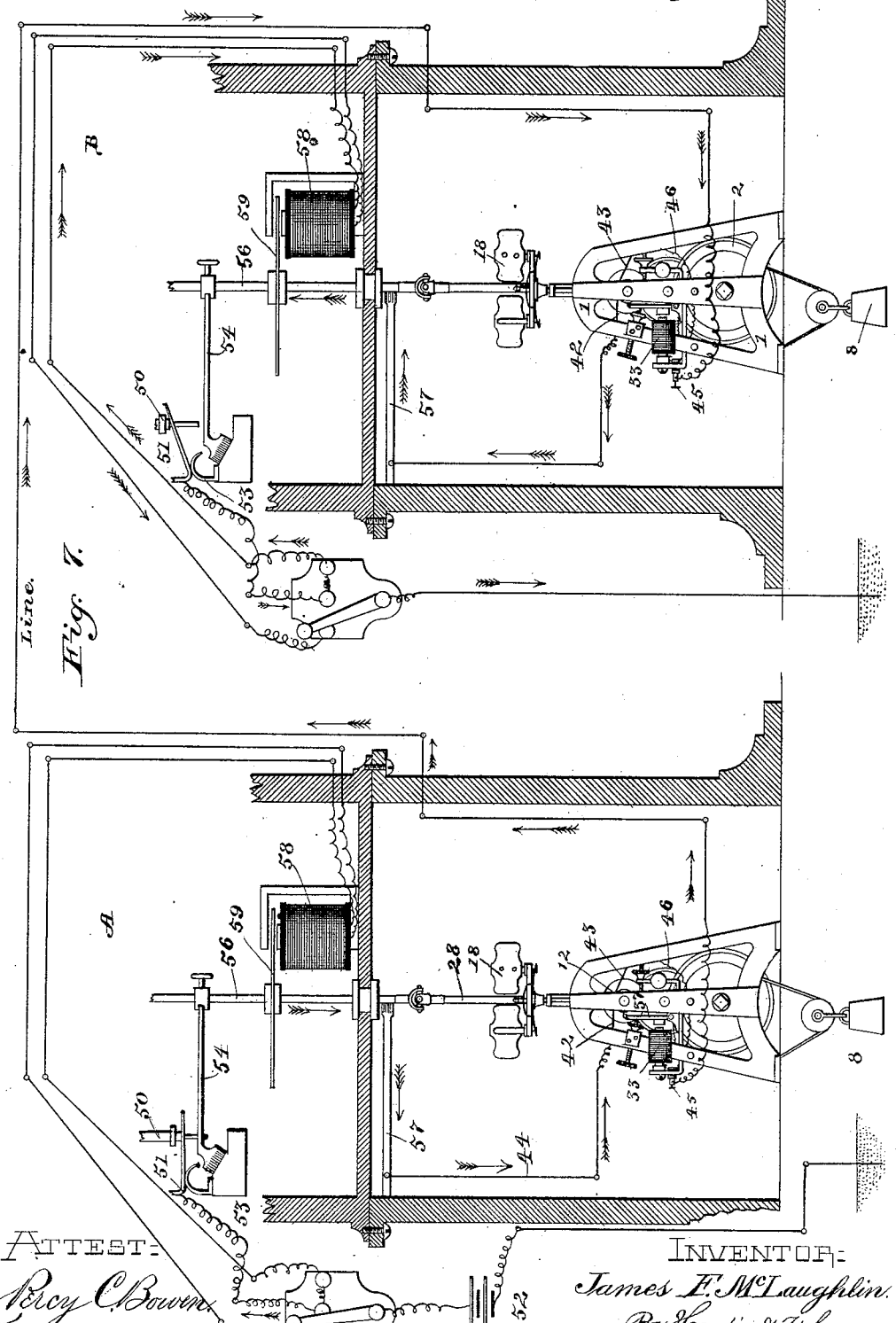

Figure 1 is a vertical sectional view showing in elevation the essential features of my invention. Fig. 2 is a similar view showing the train of wheels of a clock-movement geared to and operating the upright shaft. Fig. 3 is a transverse vertical section showing the different parts in side elevation. Fig. 4 is a detail view in elevation of the magnets, local electrical connections, armature, contact-brushes, &c. Fig. 5 is a plan view of the same. Fig. 6 is a detail view, partly in section and partly in elevation, of a speed-governor for the instrument. Fig. 7 is a diagrammatical view showing, conventionally, two of my transmitters for electrical type-writers respectively located at two extremities of an open-line circuit and having each one of my unison-motors in position to operate its central shaft and included in the electrical circuit.

Like numbers of reference indicate corresponding parts in all views of the drawings.

Referring to the drawings by numbers, 1 indicates a suitable upright frame supporting the different parts of the instrument. The train of wheels comprising the clock-work movement are set into motion by the large pinion or gear wheel 2, which is mounted loosely on the winding-shaft 3, and is provided with a pawl-dog, 4, adapted to engage the teeth of the ratchet-wheel 5, which in turn is either keyed rigidly upon the shaft 3 or formed integral with the drum 6, which is also rigidly mounted upon the said shaft 3. The ratchet-wheel 5 is revolved normally by the cord 7, provided with a depending pulley and weight, 8, as shown more clearly in Fig. 1. However, it will be apparent that the equivalent of such construction would be a spring suitably arranged for normally rotating the said drum. The wheel 2 meshes with the small pinion 9, which is mounted rigidly on the shaft 10, which carries the governor-wheel 11, the contact-wheel 12, and the bevel-gear 13. Upon a suitable projecting step-bracket, 14, is journaled the lower end of the upright or vertical shaft 28, carrying on its upper end a universal joint, 15, connecting with the extension-shaft arm 16, and provided near its journal-bearing with a rigidly-keyed bevel-pinion, 17, as shown in Fig. 3.

18 designates the speed-governor, which consists of two adjustable wings, 19 19, vertically pivoted in the adjustable cross-bar 20. Each pivot-pin 21 of the wings has its ends which enters its respective perforation in the end of the cross-bar 20 provided with a screw-threaded circular recess, in which is secured one of the screw-threaded bolts 22.

23 23 are two curved springs respectively secured at one end to the under side of the cross-bar 20 by a small rivet, and has its other bifurcated extremity suitably fitted under the head of each of the bolts 22 22, so that their tension will exert sufficient pressure on each of the pivot-pins 21 21 to prevent the resistance of the air from displacing the set position of the wings 19 19. (See Fig. 6.) Upon and near the upper end of the governor-shaft 24 is mounted securely a circular collar or support, 25, which forms a seat or bearing for the cross-bar 20.

26 is a spring friction-clutch, which is secured on the shaft 24 by a pin, 27, and bears on the cross-bar 20 equally on each side thereof, thereby preventing the said cross-bar from being dislodged or turned by the revolution of the wings. The shaft 24 is suitably supported in a rectangular frame, 60, which is fastened to the frame-work 1.

61 is a small pinion keyed on the lower end of the said shaft 24, and meshes with the large wheel 11, by which construction rotary motion is transmitted to the governor-shaft.

As shown in Fig. 2, the shaft 28 is attached suitably on the end of the governor-shaft 24 in any convenient manner, thereby simplifying the construction and dispensing with the pinions 13 and 17 and the bracket 14.

The contact-wheel 12 is, as before stated, journaled rigidly upon the shaft or arbor 10 by a pin, 29, which passes through an insulated transverse aperture, 30, or may be provided with an exterior sleeve of hard rubber or other insulation. (See Figs. 3, 4, and 5.) The drum or wheel 12 is also insulated by a sleeve of hard rubber or other insulating material, 31, from the shaft 10, as shown in the above-mentioned figures. At any suitable point upon the periphery of the contact-wheel 12 is embedded or otherwise secured a platinum contact pin or projection, 32, as shown in Figs. 1 and 4, the object of which will be fully explained hereinafter.

33 designates an electro-magnet provided with the usual yoke-piece, 34, which is suitably fastened by screws or rivets to a non-magnetic supporting-bracket, 35, which in turn is supported conveniently and in proper relative location upon the frame-work 1 of the instrument. (See Figs. 1 and 4.) The armature 36 of the electro-magnet is fastened and in substantially a parallel plane to the poles of the said magnet upon the armature-lever 37, which is pivotally attached at its lower end to an upright base on the bracket-frame 35, and is provided at its upper end with a platinum contact-point, 38, adapted to engage the pin 32 when its lever is in its normal position.

39 is a suitable retracting-spring adjustably secured at one end by a set-screw, 40, to the bracket-frame, and is attached at its other end to the lever 37.

41 41 are suitable adjusting-screws supported and properly located in the frame-work 1, as shown, and arranged to be so adjusted with reference to the lever 37 as to limit or restrict its play or reciprocation.

42 and 43 are two metallic contact-brushes, which are each fixed to and insulated from the frame-work 1 at their outer ends, and bear, respectively, by their inner free ends upon the drum or wheel 12, the brush 42 being in circuit with the battery 52 through any suitable circuit-closer and switch by wire 44, and the brush 43 in circuit with the line and electro-magnet 33 through binding-posts 45 and wire 46. (See Fig. 4.)

47 indicates the wire electrically connecting the magnet 33 with the armature-lever 37.

By reference to Fig. 3 of the drawings it will be seen therefrom that the tread of the drum of wheel 12 is sufficiently wide to allow the pin 32 to be on one side of the line of contact of the brushes 42 and 43. In the said line of contact, and upon the periphery of the wheel 12, is let in or inserted a piece of insulation, 49, whose surface conforms to the curvature of the surface of the said wheel. This insulation-piece 49 is so located with relation to the pin 32 that the brush 43 will engage or pass thereupon just before and also at the time the pin 32 is arrested by the end of the lever 37.

In explanation of the diagram or theoretical view shown in Fig. 7 it will be seen that two of the transmitters A and B, before mentioned, are locally and electrically connected with a synchronal motor of the construction previously described, the line between the station-instruments A and B extending between the binding-posts 45 45 of the respective motors. In arranging one of the said transmitters in conjunction with the subject-matter of this application at the respective extremities of the line it is thought to be unnecessary to show the full construction of the auxiliary instruments A and B, as sufficient is illustrated to represent clearly their combined operation and to enable any one to follow the circuits and electrical connections.

Briefly, the transmitting-instruments consist each of a series of metallic keys, (one, 50, only being shown,) carrying the desired letters or characters, mounted on the top of the cylindrical casing of the instrument, so that the depression of any one of them will cause the contact of one of a series of retracting-springs, 51, charged normally from a suitable constant battery, 52, with another of a series of upwardly-projecting metallic springs, 53, respectively connected at their lower ends to a series of circularly-arranged vertically-adjustable segments, which correspond in number and relative situation to the number of keys of the key-board, thereby closing the circuit from the said battery and conducting the impulse so imparted through the segments to a rotating contact-brush, 54, rigidly secured at right angles to the central upright shaft, 56, driven by my improved synchronal motor, and carrying another external parallel indicating-arm (not shown) on its upper end, and arranged in line with the contract-brush 54, and pointing to the corresponding character of the key-board, as indicated by the said contact-brush on the segments.

When the current passes through the inner brush-arm, 54, it is conducted down through said shaft to another stationary brush-arm, 57, fixed to the side of the casing, and then, as herein shown, after passing through the circuit and the two motors connected with the instruments A and B and influencing the relative operation of said motors in a manner to be hereinafter described the current will pass through the instrument B in an inverse order to that in instrument A, and the segments and their superincumbent springs being raised up against the retracting-springs 51, the current passes through the said springs, (they all being in contact and the brush rotating in contact therewith,) out down to a suitable switch, as shown, the lever of which is properly adjusted. Thus the said current traverses through the said switch and up around the transmitter B into an electro-magnet, 58, which is located in proximity to a soft-iron disk, 59, also rigidly keyed to the central shaft, 56, of the instrument B, said magnet having its converted lower pole brought around and up parallel and above the upper pole. Therefore the disk will in its revolution rotate centrally in the magnetic field between said poles, and the current previously described as having energized the magnet causes the attraction of said disk, thereby arresting the rotation of the central shaft with the two parallel arms attached thereto, respectively, at the segment of the key and the key corresponding to the key depressed at the other end of the line. The current upon the release of the circuit-closing key at instrument A then escapes from the magnet by a second wire, which connects with the switch, the lever of which, being properly pointed, allows said current to pass therethrough on to ground.

It will be obvious that since the motors electrically connected with the instruments A and B are upon a normally-open circuit, the armature-lever 37 of each will be in its normal inactive position, and the pin or projection 32 on contact-wheel 12 will be obstructed by and supported upon the end of the said lever 37, thereby holding the upright shafts 28 and 56 motionless.

Now, before entering into an explanation of the manner of maintaining synchronism between the two motors and their mode of operation it will be preferable to here state that in practice particular care and mathematical exactitude should be taken in constructing the different patterns, forms, &c., for the various parts of this apparatus, so that very little, if any, perceptible difference in speed will result when two of such devices are operated at separate points; and, furthermore, in event of the existence of such difference or inaccuracy in point of relative speed the fact that the object of this invention is to eradicate such difference entirely at each and every revolution of one of the shafts actuated by said motors, it will be perfectly apparent that very little discrepancy will have to be corrected at the completion of each intermittent revolution of either of the said separated shafts. Conceding that such difference in relative action does exist, and that it is detrimental to the efficient and accurate operations of the central shafts, 56 56, of the instruments A and B, there will be only two ways in which the difficulty of inequality in speed will present itself—viz., where the shaft of the instrument A is revolved faster than that of the instrument B, and vice versa.

In order to render the subsequent operation entirely comprehensive, we will suppose that the instrument A has been used to transmit over the line to instrument B, and that during such operation no discrepancy of relative action has existed, then in accordance therewith the operation would be as follows: To give the train of mechanism an initial start or impetus, the operator will first observe the location of the trailing arm upon the segments, and will accordingly depress the key corresponding to such segment in order to close the circuit for releasing the armature-lever from the escapement-pin.

When the key 50 of the instrument A is depressed by the operator, as shown in Fig. 7, the circuit will be closed from the battery 52, and, as the shaft 56 and consequently the shaft 28 of the motor are both idle, and the assumption being that each pin 32 32 of the respective motors is resting on the end of a lever, 37, the current will simultaneously pass from the retracting-spring 51, through spring 53, its corresponding segment, the brush 54, shaft 56, stationary brush 57, and wire 44 to the motor-brush 42, contact-wheel 12, pin 32, lever 37, wire 47, magnet 33, binding-post 45, line, binding-post 45 of the motor of instrument B, and through the said motor in an inverse order to that at the other end of the line, thereby simultaneously energizing the respective electro-magnets, 33 33, causing the attraction of their armatures, and consequently the instantaneous withdrawal of the levers 37 37, which action will allow both of the contact-wheels 12 12 to start off simultaneously. In this operation it will be understood that the current passes from the brush 42, through the wheel 12 and pin 32, to the lever 37, and inversely, because the brushes 43 43 are upon the insulations 49 49. Now, suppose that after the contact-wheels 12 12 at both extremities of the line are started off together by the simultaneous withdrawal of the levers 37, the wheel 12 of the motor of instrument A is slightly in advance or is revolving at a greater rate of speed than the corresponding contact-wheel of the motor connected with instrument B; and, furthermore, we will premise that during such revolution and just at the time the contact-wheel, which is in advance, completes its revolution, another key, 50, is struck by the operator at instrument A, then in this case the current will traverse the same path as before described, up to the binding-post 45, at the other end of the line; but the circuit will be there broken, inasmuch as the pin 32 has not yet made contact with the lever 37, and as the brush 43 is already sufficiently upon the insulation 49 to prevent the completion of the circuit therethrough, the said insulation-piece being, as before stated, of the required size to allow the brush 43 to be thereupon at a time before the engagement of the pin 32 with the lever 37 equal to the maximum difference of speed that can arise between any two motor-shafts during one revolution of either of them. Therefore the line will be substantially open-circuited until the pin 32 of the contact-wheel 12 of the motor connected with instrument B makes engagement or contact with the lever 37, and when such contact is made the circuit will be completed from battery 52 throughout the line to ground, and the respective magnets, 33, will be simultaneously energized, causing their respective armatures to be instantaneously attracted, and thereby permitting the contact-wheels 12 12 at both extremities of the line to again start off at the same moment, irrespective of any difference of meridian time that may exist between places in which the instruments are respectively located. Upon the release of the key depressed the circuit will be again broken, the magnets de-energized, and the respective levers 37 37 will be restored to their normal positions, obstructing the paths of their pins 32 32 by the retractibility of the springs 39 39. Again, we will suppose that on the other hand the contact-wheel 12 of the motor of instrument B is somewhat in advance of the other at the distant extremity of line. Then it will be obvious that the circuit will be open at the said corresponding contact-wheel at the other extremity until its pin 32 engages the contact-point on the upper end of the lever 37, at which time the circuit will be completed and the operation will be identical with that just described.

If there exists no discrepancy in speed between the two motors at the respective extremities of the line, it will be obvious that the circuit for the current will be continuously closed, even though the respective pins 32 are not in engagement with the armature-lever, inasmuch as the brush 43 at each end is never upon the insulation except when the pin 32 is in engagement with the armature-lever.

The brushes 43 are only utilized to complete the circuit when one or more keys are depressed during the interim of time while the contact-wheels 12 12 are revolving, as they (the brushes 43 43) are then not upon the insulations 49 49.

By means of the speed-governor 18 the motors may be so arranged as to revolve at any rate of speed desirable by adjusting the wings 19 19 at different angles to the cross-bar 20.

An important and specially prominent feature of this invention when it is used in conjunction with an instrument of the class illustrated is that where two of such combined apparatus are located as shown, respectively, at two extremities of a line the operator at the transmitting-station can notify his contemporary at the receiving-station by predetermined signals to adjust his motor to correspond with the rate of speed at the said transmitting-station, and thereby rendering it impossible for any one to tap the line at any intermediate point or points, and thereby surreptitiously gain intelligence therefrom.

I have shown the clock-work mechanism operated by a cord and weight, for the reason that it is believed that the relative power exerted by two weights of the same avoirdupois corresponds more closely than that of a spring or other device. However, I do not confine myself to such construction, as obvious equivalents may be substituted without departing from the spirit of my invention.

The universal joints 15 15 are designed to allow the shafts 56 56 sufficient vertical and lateral motion when their disks 59 59 are attracted by the poles of the electro-magnets 58 58.

Having thus fully described my invention, what I claim as new, and desire to secure by Letters Patent, is—

1. The means for synchronously revolving two or more separated shafts, which consists, essentially, of a train of wheels or other suitable mechanism for imparting and transmitting rotary motion, respectively, to each of said separated shafts, a metallic insulated drum or wheel revolved by the same mechanism, hereinbefore mentioned, and provided on its tread or periphery with a current-conducting projecting pin or stud, and having a portion of its periphery formed of insulating material, the two contact-brushes or equivalent devices bearing normally at separate and relative points upon the periphery of said drum or wheel, and electrically connected substantially in the manner described, an electro-magnet included in the electrical line-circuit, a pivoted lever provided with the armature of the said electro-magnet, and adapted to normally obstruct the passage of the current-conducting pin, the electrical connections, means for making and breaking the circuit, and a suitable source of electricity, the whole being arranged to operate substantially as specified.

2. The two instruments respectively located at two extremities of a line-circuit, and each consisting, essentially, of suitable mechanism for rotating their respective main shafts, a metallic drum or wheel, also rotated by said mechanism, having a portion of its periphery formed of or provided with insulation for the purpose described, a current-conducting pin or stud located also upon the periphery of said wheel at a certain distance from the insulation, two contact-brushes or equivalents normally bearing at relative and different points upon the said drum or wheel and included in an electrical circuit, an electro-magnet, also included in the said circuit, a pivoted reciprocating lever carrying the armature of the electro-magnet and adapted to obstruct the path of the before-mentioned current-conducting pin or stud when in its normal inactive position, and the electrical connections within the said instruments, in combination with the line-circuit, means for making and breaking said circuit, and a suitable source of electricity.

3. The two instruments or motors respectively located at two extremities of a line-circuit, and each consisting, essentially, of suitable mechanism for rotating their respective main shafts, a speed governor for controlling the speed of said main shaft, a metallic drum or wheel, also rotated by said mechanism, having a portion of its periphery formed of or provided with insulation for the purpose described, a current-conducting pin or stud located also upon the periphery of said wheel at a certain distance from the insulation, two contact-brushes or their equivalents normally bearing at relative and different points upon the said drum or wheel and included in the electrical circuit, an electro-magnet, also included in said circuit, a pivoted metallic reciprocating lever carrying the armature of the said electro-magnet and adapted to obstruct the path of the before-mentioned current-conducting pin or stud when in its normal inactive position, and the electrical connections within the said instruments, in combination with an electrical line-circuit, means for making and breaking said circuit, and a suitable source of electricity.

4. The combination of two wheels or drums, each mounted upon and insulated from a rotating shaft, and each having a portion of its periphery provided with insulation, two metallic pins or studs secured, respectively, upon the peripheries of the said drums or wheels, two pairs of contact-brushes or their equivalents bearing, respectively, in pairs upon the drums or wheels at different points, two electro-magnets located each in proximity to its respective armature, two armatures respectively affixed to two reciprocating pivoted levers, two reciprocating metallic pivoted levers adapted each to normally obstruct the path of each of the current-conducting pins or studs, the respective electrical connections, means for making and breaking the circuit, and a suitable source of electricity, as shown and described.

5. The combination of the metallic drum or wheel mounted on and insulated from a rotating shaft, and having a portion of its periphery formed of insulation, a metallic pin or stud secured at a predetermined point upon the periphery of the said drum or wheel, the shaft, means for rotating same, the contact-brushes bearing normally at relative and different points upon the said drum or wheel, an electro-magnet, a pivoted reciprocating metallic lever carrying the armature of the said electro-magnet and adapted to normally obstruct the path of the metallic pin or stud, the electrical connections, the circuit, and a circuit-closer, as specified.

6. The combination of the train of wheels actuated by a suitable motive power, the main shaft of the motor provided with a universal joint for the purpose described, an adjustable speed-governor arranged to control the rate of speed of the said motor-shaft, and the electro-mechanical devices for intermittently arresting and correcting the speed of the main shaft and its actuating mechanism, substantially as shown and specified.

7. The combination of an electro-magnet in circuit with its armature, an armature pivotally supported opposite to its electro-magnet, a pivoted reciprocating metallic lever carrying said armature, and provided with suitable retracting spring, a drum or wheel having a portion of its periphery formed of insulation and provided with a metallic projecting pin or stud, said wheel or drum being in circuit with a source of electricity through a suitable device for making and breaking the circuit from said source, the two contact-brushes normally bearing at relative and different points on the periphery of said drum, means for making and breaking said circuit, and the circuit, as specified.

8. The combination of the two motors of the construction substantially as described, and located, respectively, at separate extremities of a line-circuit, and each having a clock-work mechanism operating by a weight or its equivalent, a speed-governor, a main shaft provided with a drum having a portion of its periphery formed of insulation, and provided with a current-conducting pin at a relative distance from said insulation, the contact-brushes bearing normally at relative and different points upon the said drum, and the electro-mechanical devices, such as shown, for synchronously controlling and automatically correcting the relative speed of said motors, with a line-circuit, and means for making and breaking said circuit, as specified.

9. The combination, with an insulated drum or wheel having a piece of insulation located upon its periphery, of a current-conducting pin located also upon the periphery of said drum or wheel at a relative distance from the insulation, mechanism for normally rotating said drum or wheel, two contact-brushes bearing normally upon the periphery of said drum at relative and different points and out of line with the current-conducting pin, the electro-mechanical auxiliary escapement devices, the circuit, and a suitable source of electricity, as specified.

In testimony whereof I affix my signature in presence of two witnesses.

J. F. McLAUGHLIN.

Witnesses:
E. L. WHITE,
F. R. HARDING.